United States Patent
Feller et al.

(10) Patent No.: US 8,500,159 B2
(45) Date of Patent: Aug. 6, 2013

(54) AIRBAG FOR A VEHICLE OCCUPANT RESTRAINT SYSTEM AND METHOD FOR PRODUCING AN AIRBAG

(75) Inventors: Jens Feller, Illerkirchberg (DE); Torsten Schmidt, Berlin (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/187,290

(22) Filed: Jul. 20, 2011

(65) Prior Publication Data

US 2011/0272927 A1 Nov. 10, 2011

Related U.S. Application Data

(63) Continuation of application No. PCT/EP2010/050632, filed on Jan. 20, 2010.

(30) Foreign Application Priority Data

Jan. 21, 2009 (DE) .................. 10 2009 005 834

(51) Int. Cl.
*B60R 21/233* (2006.01)
*B60R 21/2346* (2011.01)
*B60R 21/26* (2011.01)

(52) U.S. Cl.
USPC ........... 280/729; 280/742; 280/739; 280/740; 280/743.1

(58) Field of Classification Search
USPC ........... 280/729, 742, 739, 740, 743.1, 730.2
See application file for complete search history.

(56) References Cited

U.S. PATENT DOCUMENTS

| 5,586,782 A | 12/1996 | Zimmerman et al. |
| 5,697,641 A | 12/1997 | McGee et al. |
| 5,718,450 A * | 2/1998 | Hurford et al. ............ 280/730.2 |
| 5,895,070 A | 4/1999 | Lachat |
| 5,957,493 A | 9/1999 | Larsen et al. |
| 6,059,312 A * | 5/2000 | Staub et al. ................... 280/729 |
| 6,065,772 A | 5/2000 | Yamamoto et al. |

(Continued)

FOREIGN PATENT DOCUMENTS

| DE | 197 19 151 A1 | 11/1997 |
| DE | 197 42 151 B4 | 4/1998 |

(Continued)

OTHER PUBLICATIONS

International Search Report in PCT/EP2010/050632 dated May 7, 2010.

*Primary Examiner* — Joseph Rocca
*Assistant Examiner* — George Spisich
(74) *Attorney, Agent, or Firm* — Foley & Lardner LLP

(57) ABSTRACT

An airbag for a vehicle occupant restraint system is provided. The airbag comprising a first and a second chamber, which can be inflated for the protection of a vehicle occupant; having an outflow element with an outflow duct via which the gas can flow out of the first chamber when the internal pressure in the first chamber exceeds the internal pressure in the second chamber and which can be compressed under the action of the internal pressure in the second chamber such that an outflow of gas out of the second chamber is counteracted, when the internal pressure in the first chamber is lower than the internal pressure in the second chamber, the outflow element has a two-layer material piece and the outflow duct is formed by folding in a portion of the material piece between the material layers of the material piece.

18 Claims, 5 Drawing Sheets

U.S. PATENT DOCUMENTS

| | | |
|---|---|---|
| 6,213,499 B1 | 4/2001 | Khoudari et al. |
| 6,402,190 B1 | 6/2002 | Heudorfer et al. |
| 6,439,605 B2 | 8/2002 | Ariyoshi |
| 6,561,539 B1 | 5/2003 | Sunabashiri et al. |
| 6,715,786 B1 | 4/2004 | Willibey |
| 7,168,736 B2 | 1/2007 | Tanase et al. |
| 7,338,069 B2 | 3/2008 | Breed |
| 7,347,445 B2 * | 3/2008 | Choi .......................... 280/729 |
| 2006/0001244 A1 | 1/2006 | Taguchi et al. |
| 2006/0131845 A1 | 6/2006 | Belwafa et al. |
| 2006/0175809 A1 | 8/2006 | Yamaji et al. |
| 2006/0232054 A1 | 10/2006 | Schlosser et al. |
| 2006/0261579 A1 | 11/2006 | Breed |
| 2007/0024033 A1 | 2/2007 | Suzuki et al. |
| 2008/0174093 A1 | 7/2008 | Inoue |
| 2008/0179867 A1 | 7/2008 | Riedel et al. |
| 2009/0020987 A1 | 1/2009 | Wipasuramonton et al. |
| 2009/0322062 A1 * | 12/2009 | Bauer et al. .................. 280/729 |

FOREIGN PATENT DOCUMENTS

| | | |
|---|---|---|
| DE | 199 30 155 A1 | 1/2001 |
| DE | 199 30 157 A1 | 1/2001 |
| DE | 197 42 151 B4 | 11/2005 |
| DE | 10 2005 028 702 A1 | 3/2006 |
| DE | 698 35 735 T2 | 12/2006 |
| DE | 10 2005 034 250 A1 | 2/2007 |
| DE | 20 2007 007 356 U1 | 11/2007 |
| DE | 10 2008 030 188 A1 | 1/2009 |
| EP | 1 595 751 A1 | 11/2005 |
| JP | 04-244453 | 9/1992 |
| WO | WO-03/057540 A1 | 7/2003 |
| WO | WO-2006/131351 A1 | 12/2006 |
| WO | WO-2007/110167 A1 | 10/2007 |
| WO | WO-2007/134729 A1 | 11/2007 |
| WO | WO-2008/141889 A1 | 11/2008 |

* cited by examiner

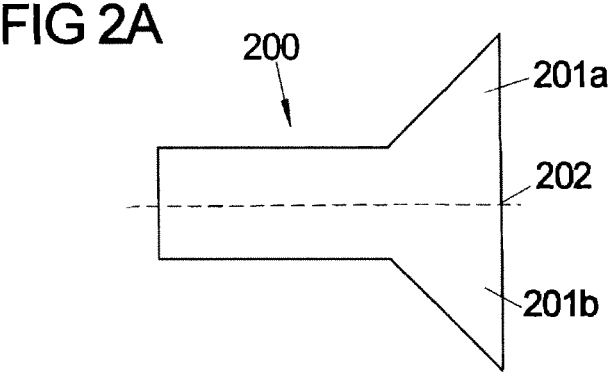
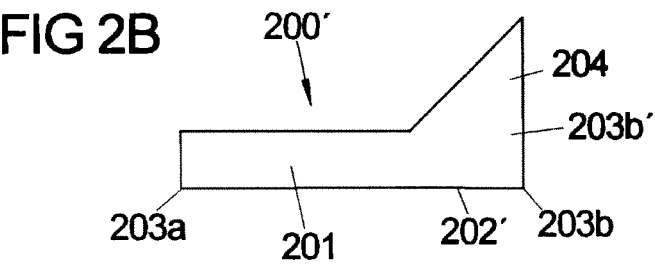
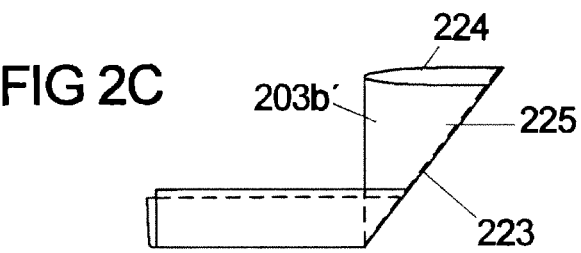

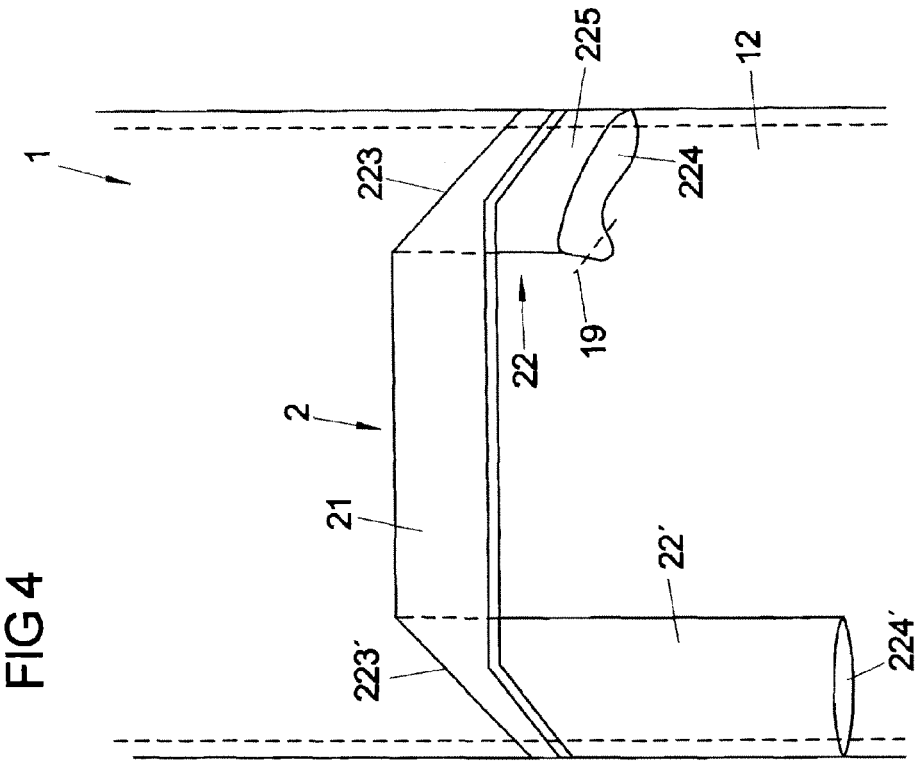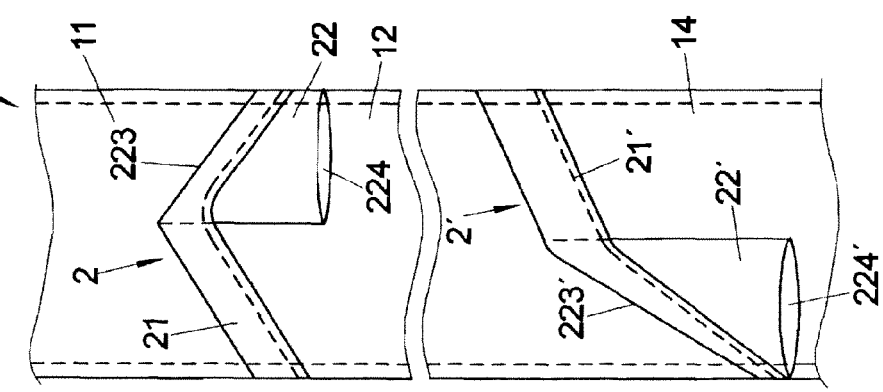

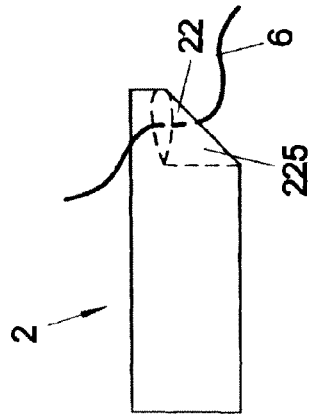
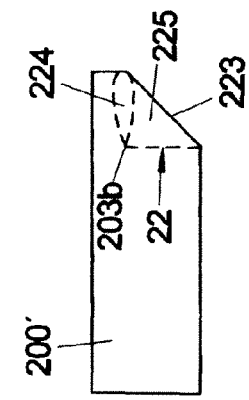
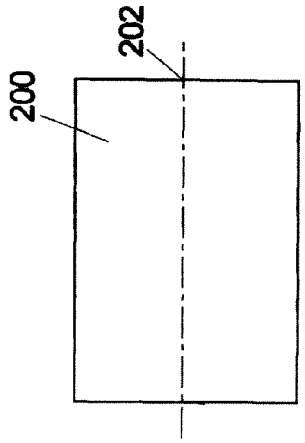
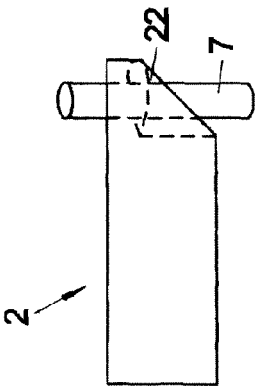
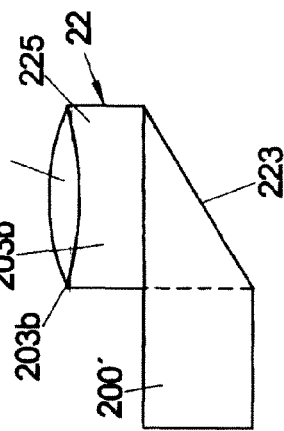
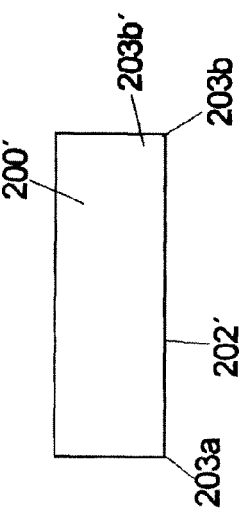
FIG 5A
FIG 5B
FIG 5C
FIG 5D
FIG 6A
FIG 6B

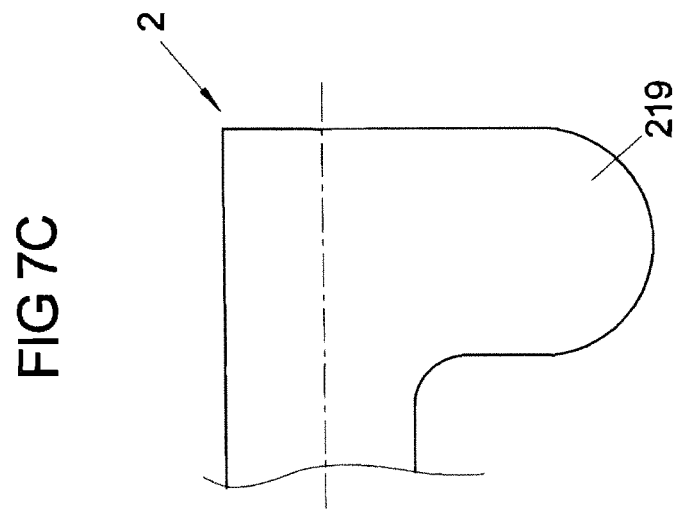
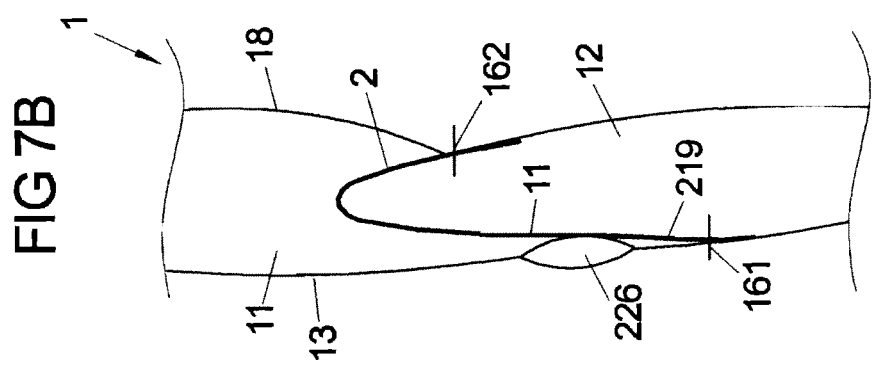
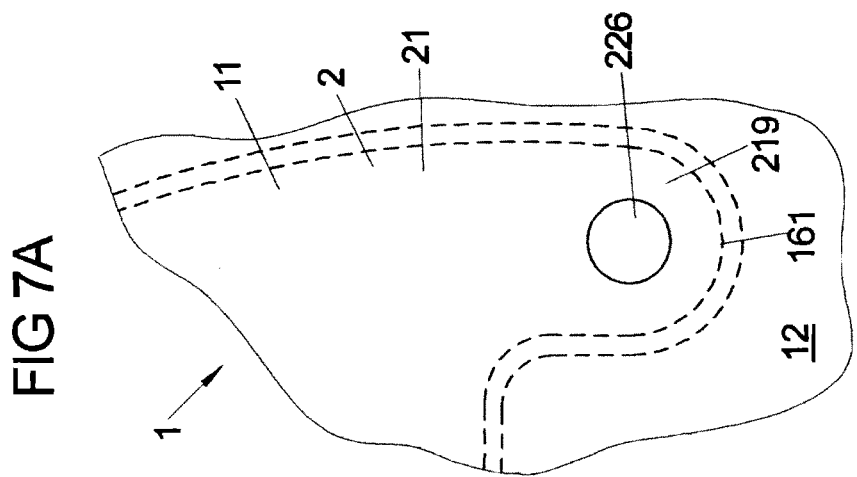

AIRBAG FOR A VEHICLE OCCUPANT RESTRAINT SYSTEM AND METHOD FOR PRODUCING AN AIRBAG

CROSS-REFERENCE TO RELATED PATENT APPLICATIONS

This application is a continuation of International Patent Application Number PCT/EP 2010/050632, filed Jan. 20, 2010, which was published in German as WO 2010/084128. The foregoing international application is incorporated by reference herein.

BACKGROUND OF THE INVENTION

The invention relates to an airbag for a vehicle occupant restraint system and a method for producing an airbag.

An airbag is for instance known from DE 10 2005 034 250 A1.

SUMMARY OF THE INVENTION

The object being solved by the invention is to provide an airbag, wherein its chambers can be filled with different internal pressures and which can be produced in as far as possible simple manner.

According to an exemplary embodiment of the invention, an airbag for a vehicle occupant restraint system is being provided, comprising
 a first and a second chamber, which can be inflated for the protection of a vehicle occupant;
 an outflow element with an outflow duct via which the gas can flow out from the first chamber, when the internal pressure in the first chamber exceeds the internal pressure in the second chamber, and which can be compressed under the action of the internal pressure in the second chamber such that an outflow of gas from the second chamber is counteracted, when the internal pressure in the first chamber is lower than the internal pressure in the second chamber, wherein the outflow element comprises a two-layer material piece and the outflow duct is formed by folding in a section of the material piece between the material layers of the material piece.

If the internal pressure in the second chamber exceeds the internal pressure in the first chamber during or after filling the airbag (via a gas generator), the outflow cross section of the outflow duct is thus reduced. Thus in case for instance of an impact of the vehicle occupant and an increase of the internal pressure in the second chamber connected to the impact an escape of gas from the second chamber can be avoided.

The outflow element consists in particular of one material layer or of multiple material layers, which can be formed for instance from a fabric (in particular from an airbag material). Such an outflow element can be produced in a simple manner and can be connected to at least one airbag layer, which delimits the first and the second chamber of the airbag, for instance by sewing or gluing.

Furthermore, the outflow element is in particular an element produced separately from the airbag layer of the airbag (for instance a fabric piece), which is arranged in the interior of the airbag and is connected to the one airbag layer or the multiple airbag layers. The outflow element is for instance arranged such that it extends into the second chamber.

In a further exemplary variant of the invention the two-layer material piece (for instance a two-layer airbag material or another two-layered flat piece) has a folding edge and the outflow duct is formed by folding in a corner, which is present between the folding edge and a lateral edge of the material piece. However, a sharp folding edge does not have to be necessarily present, but rather the material piece can be simply bent over for instance along the folding line. A sharp corner does also not have to be necessarily present. It is also conceivable, that a section of the material portion is folded in, which extends in a portion, in which the folding line strikes a lateral edge of the material piece being for instance curved in this portion.

In another exemplary embodiment of the invention the outflow element comprises a first section, which separates the first from the second chamber, and a second section, which has the outflow duct. The first section of the outflow element is for instance connected in one piece to the second section of the outflow element.

The outflow element forms according to this variant therefore on the one hand a separating means (for instance in form of a separating wall), which separates the first from the second chamber of the airbag at least sectionally (in particular also gas-tight). The outflow element forms simultaneously the outflow duct, which releases dependent on the pressure an outflow opening via which gas can flow out of the first chamber.

In a further exemplary variant of the invention the outflow duct is designed and arranged such that via said duct gas can flow from the first chamber out of the airbag. In this variant the possibility is therefore provided, that gas can flow out from the first chamber in dependency on the pressure difference between the first and the second chamber from the airbag into the surroundings, in particular in order to regulate the internal pressure in the first chamber.

In a further exemplary embodiment the outflow duct is designed and arranged such that via said duct gas can flow out of the first chamber over into the second chamber. In this variant the second section of the outflow element, which forms the outflow duct, acts as a non-return valve, which prevents in particular the outflow of gas from the second chamber, when the internal pressure increases there.

In an improvement the first chamber comprises an additional outflow opening via which gas can flow from the first chamber into the surroundings such that the internal pressure decreases in the first chamber. A flowing back of gas from the second into the first chamber is however prevented by the blocking outflow duct when the internal pressure in the first chamber decreases.

It is also possible that a section of the outflow element extends between an outflow opening of the first chamber and the second chamber such that the section is pressed by the internal pressure in the second chamber against the outflow opening and blocks said opening, when the internal pressure in the second chamber exceeds the internal pressure in the first chamber.

Furthermore, the airbag can comprise a first and a second airbag layer, which delimit the first and the second chamber, wherein one of the material layers of the material piece is connected to the first airbag layer and the other material layer of the material piece is connected to the second airbag layer.

In a modification the outflow element comprises a triangular portion, which delimits the outflow duct. Furthermore, the outflow duct can comprise two outflow openings, which oppose each other along the axis of the outflow duct, wherein the outflow opening facing the first chamber continues inclined to the axis of the outflow duct. The outflow opening facing the first chamber continues in particular in an angle to a first section of the outflow element, which separates the first and the second chamber from each other.

According to another exemplary embodiment the outflow element is designed ribbon-like, wherein at least one end of the ribbon forms an outflow duct.

It is pointed out that the outflow element can also form multiple (in particular separated from each other) outflow ducts, which bring the chambers of the airbag for instance at different positions in a fluid communication with each other. Multiple outflow ducts can also be for instance formed by a seam, which continues in flow direction and divides an outflow portion between two material layers of the outflow element in multiple sections.

It is also to be understood that the airbag can comprise also more than two chambers and that for instance at least one outflow element is present between two of the chambers.

It is further to be mentioned that the term "outflow duct" does not necessarily mean that said duct has to have imperatively a longitudinal geometry in flow direction, in fact the invention comprises also outflow ducts, the dimensions thereof is larger crosswise to the flow direction than in flow direction.

In a further exemplary modification of the invention a component of the airbag module is passed through the outflow duct of the outflow element, for instance an electrical wire, a gas generator or a mounting element (for instance a bolt). Due to the action of the internal pressure in the airbag and the compression of the outflow duct a sealing of the component passing through the duct is in particular realized.

In a second exemplary aspect of the invention an airbag for a vehicle occupant restraint system is provided with
- a first and a second chamber, which can be inflated for the protection of a vehicle occupant;
- an outflow element via which gas can flow out from the first chamber, when the internal pressure in the first chamber exceeds the internal pressure in the second chamber, and which blocks an outflowing of gas from the first chamber, when the internal pressure in the first chamber is lower than the internal pressure in the second chamber, wherein
- the outflow element separates with a first section the first from the second chamber and forms with a second section at least one outflow duct, which is compressed by the action of the internal pressure in the second chamber, when the internal pressure in the second chamber is larger than the internal pressure in the first chamber.

According to a modification the outflow duct is formed between the second section and an airbag layer, which delimits the first and/or the second chamber of the airbag. The outflow element is in particular connected in the portion of its second section along its lateral edges to the airbag layer.

The invention relates furthermore to a method for producing an airbag for a vehicle occupant restraint system, in particular for producing an airbag as described above. The method comprises the steps of
- providing at least an airbag layer for producing a first and a second inflatable chamber;
- arranging an outflow element on the airbag layer, which is compressed by the action of the internal pressure in the second chamber, when the internal pressure in the second chamber is larger than the internal pressure in the first chamber, wherein
- the producing of the outflow element comprises the following steps:
- providing a two-layer material piece;
- folding in at least one section of the material piece between the two material layers in order to form the outflow duct.

In an exemplary modification of the method the production of the outflow element comprises the following steps:

- folding (or bending) of a starting material piece such that a two-layered material piece is formed, which comprises in each case a corner on the ends of the folding edge obtained along the folding line;
- folding in at least one of the corners between the two material layers of the two-layer material piece.

When folding in the corner on one end of the folding line said corner is in a way folded inwards, that means in this portion an external side of the material cut is brought between the two layers of the sub-portion such that said external side forms an internal side of the outflow duct after folding in.

The two-layer material piece is in particular fixed to the material layer before folding in. The outflow element can for instance—as already mentioned above—has a first section, which serves the separation of the two chambers, and a second section, which forms the outflow duct. Such an outflow element can for instance be connected to the airbag layer of the airbag in the portion of the first section, before the folding in of a portion of the second section occurs.

In an exemplary variant the folded material cut has a two-layer, approximately rectangular base portion. A portion is in particular folded in over a corner of this rectangular base portion via a lateral edge of the base structure, that means the outflow duct formed by folding in projects over the rectangular structure. An outflow element is in particular produced that has an outflow duct, which extends angled (in particular crosswise) to the remaining parts of the material cut, which forms the "first section" of the outflow element.

BRIEF DESCRIPTION OF THE DRAWINGS

The invention is being explained in the following in more detail by the means of embodiments with reference to the Figures.

FIG. 2A-2C show steps for producing an outflow element for the airbag according to the invention.

FIG. 3 shows a section of an airbag according to a second embodiment of the invention.

FIG. 4 shows a section from an airbag according to a third embodiment of the invention.

FIG. 5A to 5C show steps for producing an outflow element according to a further variant of the airbag according to the invention.

FIG. 5D shows a modification of the outflow element of the FIGS. 5A-5C.

FIGS. 6A and 6B show a further modification of the airbag according to the invention.

FIG. 7A to 7C show a further modification of the airbag according to the indention.

DETAILED DESCRIPTION OF THE PREFERRED EMBODIMENTS

Figure 1B:
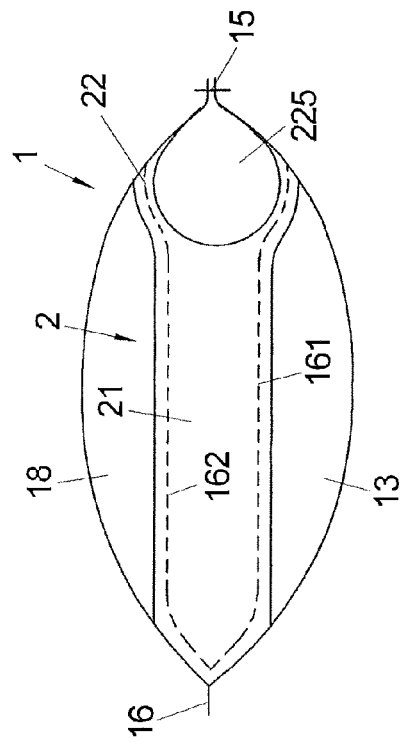
FIG. 1A-1C show a section of an airbag according to a first embodiment of the invention.
Figure 1C:
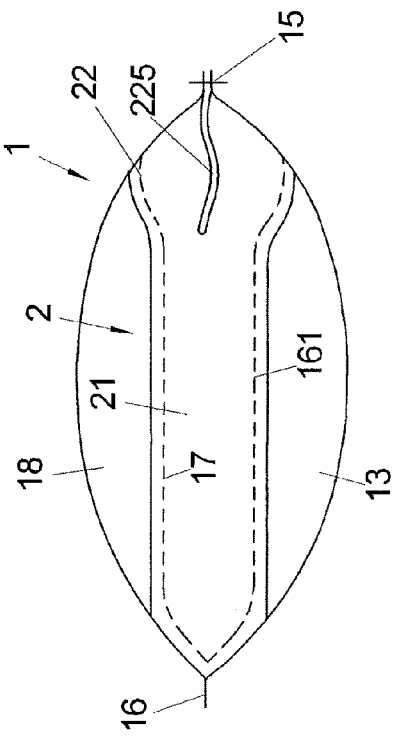
Figure 1A:
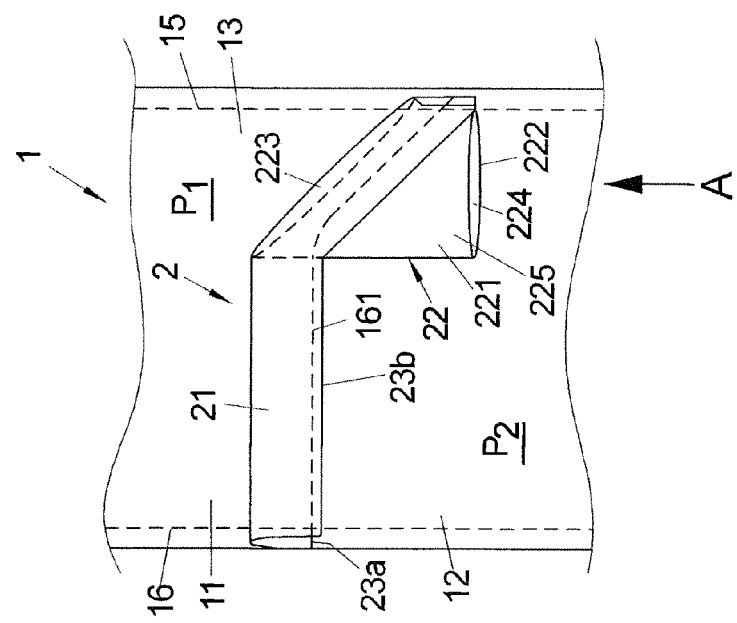

FIG. 1A shows the interior of an airbag 1 according to the invention, which comprises a first chamber 11 and a second chamber 12. The airbag 1 comprises furthermore a first airbag layer 13 and a second airbag layer (not shown), which delimit the first and the second chamber 11, 12. The two airbag layers are connected to each other via seams 15, 16.

An outflow element in form of a ribbon 2 (for instance in form of an airbag retaining ribbon) is arranged between the first and the second chamber 11, 12. The ribbon 2 has a first section 21, which is arranged between the first and the second chamber 11, 12 and separates them from each other. Furthermore, the ribbon 2 has a second section 22 (connected in one piece to the first section 21), which realizes an internal pressure depending fluid communication between the first and the second chamber.

The first section 21 of the ribbon 2 is bent (folded) such that it comprises longitudinal sides 23a and 23b opposing each other, which are in each case connected to the internal side of the first airbag layer 13 (via a seam 16) or the second airbag layer. Therefore, the first section 21 of the ribbon 2 extends between the airbag layers of the airbag and provides for an essential gas-tight separation of the first from the second chamber in this portion.

The second section 22 forms an essential tubular-like outflow duct 225, which is formed between two material layers 221, 222 of the outflow element arranged opposite to each other. The outflow duct 225 is compressed by the action of the internal pressure P2 in the second chamber 12, when the internal pressure P2 is larger than the internal pressure P1 in the first chamber 11. Thus, the outflow duct 225 allows an outflowing of gas from the first chamber 11 into the second chamber 12, when the internal pressure P1 in the first chamber is larger than the internal pressure P2 in the second chamber, while an overflowing of gas out of the second into the first chamber is counteracted or completely prevented, when the internal pressure P1 is smaller than the internal pressure P2.

The second section 22 (that means in particular the outflow duct 225) of the outflow element 2 is produced by folding in a section of a two-layer material piece (compare FIGS. 2A to 2C). The tubular-like duct 225 is obtained by folding in, wherein said duct comprises outflow openings 223, 224 opposing each other along its axis (of the flow direction). The edge of the first outflow opening 223 is in a plane, which is oriented diagonal to the first section 21 and diagonal to the flow direction of the gas flowing through the outflow duct 225. The second outflow opening 224 is, on the other hand, in a plane, which is oriented crosswise to the duct axis.

In order to prevent a folding back of the folded section, which forms the outflow duct 225, in direction to the first chamber 11, the second section 22 can be defined additionally on the first and/or the second material layer of the airbag, for instance by the means of a seam.

The second section 22 is sewed to the two airbag layers via the seam 16, via which the first airbag layer 13 is connected to the second airbag layer. Furthermore, the second section 22 is sewed in the portion of the second outflow opening 224 via the lateral seam 15 to the first as well as to the second airbag layer of the airbag 1.

The FIGS. 1B and 1C show the airbag of FIG. 1A in a view along the arrow A in FIG. 1A, wherein FIG. 1B shows that case that the pressure in the first chamber 11 is higher than the internal pressure in the second chamber 12 so that gas can flow out from the first chamber into the second chamber and the outflow duct 22 is thereby widened.

FIG. 1C shows the inverse case, namely that the internal pressure P2 in the second chamber 12 is larger than the internal pressure P1 in the first chamber so that the outflow duct 225 is compressed so that the outflow cross section is reduced and the gas flow between the first and the second chamber is reduced or completely suppressed.

The FIGS. 2A to 2C show a method for producing the outflow element 2 of the FIGS. 1A to 1C. At first, a starting material piece (for instance in form of a material cut) 200 is provided, which comprises in the portion of the second section of the outflow element to be produced rectangular sections 201a, 201b. The material cut 200 is folded along a folding line 202 and/or is at least bent such that a two-layer material piece 200' is obtained, that comprises a rectangular base portion 201, to which a two-layer rectangular section 204 is adjacent. A corner 203a, 203b is in each case present on the ends of the folding edge 202' obtained along the folding line.

The portion 203b' of the material piece 200' being adjacent to the corner 203b is folded in between the two layers of the folded material cut such that the folded-in portion projects over the base portion 201 and forms the outflow duct 225, which comprises a first outflow opening 223 and an outflow opening 224 arranged opposite to each other.

It is conceivable that the portion of the second corner 203a is also folded-in in order to produce a second outflow duct. Furthermore, the invention is of course not restricted to the use of a starting cut shown in FIG. 2A. Also cuts with a different geometry can be used, for instance an approximately rectangular cut without the rectangular attachments 201a, 201b.

FIG. 3 shows a section of a further embodiment of the airbag according to the invention. In comparison to the FIGS. 1A to 1C two outflow elements 2 and 2' are arranged, wherein the outflow element 2 comprises similar to the one of FIGS. 1A to 1C a first section 21, which separates a first chamber 11 from a second chamber 12 of the airbag.

The second outflow element 2' separates with a first section 21' the second chamber 12 from a third chamber 14 of the airbag. The outflow elements 2, 2' comprise in each case a second section 22, 22', which forms an outflow duct 22 or 22' between the adjacent chambers. The outflow elements 2, 2' can be produced in particular by a method according to the FIGS. 2A to 2C.

In contrast to FIG. 1A the outflow duct 22 or 22' in FIG. 3 is not arranged vertical to the first section 21 or 21', but rather with an acute or an obtuse angle. The angle between the first section and the outflow duct is selected adapted to the requirements. Furthermore, the orientation of the outflow openings 223, 224 or 223', 224' can be provided in particular by the type of folding in (compare FIGS. 2A to 2C) relative to the course of the first section 21, 21'.

FIG. 4 relates to a further embodiment of the airbag according to the invention. The outflow element 2 comprises in this variant two outflow ducts 22, 22', which are adjacent to opposite ends of the first section of the ribbon-like formed outflow element 2. The outflow duct 225 is fixed via an additional seam 19 to one of the airbag layers of the airbag.

The FIGS. 5A to 5D relate to a further method of producing an outflow element for the airbag according to the invention. At first, a starting material piece 200 is folded along a folding line 202, such that a two-layer, rectangular material piece 200' is obtained (FIG. 5B). A portion 203b' near the corner 203b of the material piece 200', which is between the obtained folding edge 202' and a shorter side of the material piece 200', is folded in between the two layers of the material piece 200'.

By folding in the portion 203b' over the corner 203b an outflow duct 225 with a first outflow opening 223 and a second outflow opening 224 emerges. In the example of FIG. 5C the portion is only folded over the corner 203b in as far the emerging outflow duct 225 does not project over the two-layer material piece 200' (this means the outflow duct is—looked at in flow direction—shorter than the shorter side of the rectangular material piece 200').

According to the improvement of FIG. 5D the portion is folded in over the corner 203b so far that the emerging outflow duct 225 projects over the material piece 200'.

The FIGS. 6A and 6B show a modification, whereby a component of an airbag module (wire 6 in FIG. 6A or gas generator 7 in FIG. 6B) is passed through the outflow duct 225 of the outflow element 2.

FIGS. 7A to 7B relate to a further embodiment of the airbag according to the invention. The airbag comprises again a first and a second chamber 11, 12 as well as an outflow element in form of a ribbon 2. FIG. 7C shows the ribbon 2 assembled in the airbag 1.

The ribbon 2 comprises a first section 21, which separates the first from the second chamber, as well as a second section, which comprises a folded in section as non-return valve. The second section is not illustrated in the FIGS. 7A and 7B.

The first section 21 of the ribbon comprises a strap-like extension 219, which extends into the portion of an off-flow opening (venthole) 226 of the first chamber. The ribbon 2 is connected to an airbag layer 13 along a first side by the means of the seam 161, wherein said layer is arranged in FIG. 7B facing the viewer. A second side of the ribbon is connected via a seam 162 to a second layer 18 of the airbag. The ribbon 2 is designed and arranged such that the second chamber 12 extends with a portion adjacent to the strap 219 of the ribbon 2 and the outflow opening 226.

If the pressure in the second chamber 12 is larger than the pressure in the first chamber, then the strap is pressed against the internal side of the airbag layer 13 by the action of the pressure in the second chamber so that the outflow opening 226 is closed and an outflowing of gas from the first chamber via the outflow opening 226 is blocked.

The priority application, German Patent Application Number 10 2009 005 834.6, filed Jan. 21, 2009 is incorporated by reference herein.

What is claimed is:

1. An airbag for a vehicle occupant restraint system comprising:
   a first chamber and a second chamber, which can he inflated for protection of a vehicle occupant; and
   an outflow element with an outflow duct via which gas can flow out of the first chamber, when internal pressure in the first chamber exceeds internal pressure in the second chamber,
   wherein the outflow duct can be compressed by action of the internal pressure in the second chamber such that an outflow of gas out of the second chamber is counteracted, when the internal pressure in the first chamber is lower than the internal pressure in the second chamber,
   wherein the outflow element has a two-layer material piece,
   wherein the two-layer material piece has a folding edge,
   wherein the outflow duct is formed by folding in a section of the two-layer material piece in a region adjacent an edge of the two-layer material piece, wherein the edge is located at an end of the folding edge, such that the outflow duct comprises a first outflow opening and a second outflow opening,
   wherein the first outflow opening is located in a plane which is oriented diagonal to an axis of the outflow duct and the second outflow opening is located in a plane which is oriented crosswise to the axis of the outflow duct.

2. The airbag according to claim 1, wherein the first chamber and the second chamber of the airbag are limited by at least one airbag layer and the outflow element is an element manufactured separately from the airbag layer, and wherein the element is connected to the airbag layer.

3. The airbag according to claim 1, wherein the outflow element comprises a first section, which separates the first chamber from the second chamber and a second section, which has the outflow duct.

4. The airbag according to claim 1, wherein the outflow duct extends into the second chamber.

5. The airbag according to claim 1, wherein the outflow duct is designed and arranged such that via said duct gas can overflow from the first chamber into the second chamber.

6. The airbag according to claim 1, wherein the outflow duct is formed by folding in a section over a corner, which is on one end of the two-layer material piece off the folding edge.

7. The airbag according to claim 1, wherein the airbag has a first airbag layer and a second airbag layer, which delimit the first chamber and the second chamber, and
   wherein one of the two material layers of the two-layer material piece is connected to the first airbag layer and the other of the two material layers of the two-layer material piece is connected to the second airbag layer.

8. The airbag according to claim 1, wherein the outflow element comprises a triangular area, in which the outflow duct extends.

9. The airbag according to claim 1, wherein the first and second outflow openings face each other along the axis of the outflow duct, and wherein the first outflow opening faces the first chamber and is inclined to the axis of the outflow duct.

10. The airbag according to claim 9, wherein the first outflow opening faces the first chamber and is angular to a first section of the outflow element, which separates the first chamber from the second chamber.

11. The airbag according to claim 1, wherein a component of an airbag module is guided through the outflow duct.

12. The airbag according to claim 1, wherein the outflow element comprises at least one layer of an airbag material.

13. The airbag according to claim 1, wherein the outflow element is designed in a form of a ribbon.

14. An airbag for a vehicle occupant restraint system comprising:
   a first chamber and a second chamber which can be inflated for protection of a vehicle occupant;
   a first airbag layer and a second airbag layer delimiting the first chamber and the second chamber; and
   an outflow element via which gas can flow out of the first chamber, when internal pressure in the first chamber exceeds internal pressure in the second chamber,
   wherein the outflow element blocks an outflow of gas from the first chamber, when the internal pressure in the first chamber is lower than the internal pressure in the second chamber,
   wherein the outflow element separates the first chamber from the second chamber with a first section that continually blocks passage of gas between the first and second chambers and forms with a second section at least one outflow duct that selectively allows passage of the gas between the first and second chambers,
   wherein the outflow duct is compressed by action of the internal pressure in the second chamber, when the internal pressure in the second chamber is larger than the internal pressure in the first chamber, and
   wherein a first region of the first section of the outflow element is connected to the first airbag layer and a second region of the first section of the outflow element is connected to the second airbag layer.

15. The airbag according to claim 14, wherein the outflow duct is formed between the second section and one of the first and second airbag layers.

16. The airbag according to claim 15, wherein the second section of the outflow element is connected along two lateral edges facing each other to an internal side of the first airbag layer such that the outflow duct is formed between the second section and the first airbag layer.

17. A method for manufacturing an airbag for a vehicle occupant restraint system, comprising the following steps:
provoking at least one airbag layer for manufacturing a first inflatable chamber and a second inflatable chamber;
arranging an outflow element on the airbag layer, which is compressed due to action of internal pressure in the second chamber, when the internal pressure in the second chamber is larger than internal pressure in the first chamber,
wherein manufacturing of the outflow element comprises the following steps:
providing a two-layer material piece, wherein the two-layer material piece has a folding edge;
folding in at least one section of the material piece in a region adjacent an edge of the material piece,
wherein the edge is located at an end of the folding edge such that the outflow duct is formed with a first outflow opening and a second outflow opening, and
wherein the first outflow opening is located in a plane which is oriented diagonal to an axis of the outflow duct and the second outflow opening is located in a plane which is oriented crosswise to the axis of the outflow duct.

18. The method according to claim 17, wherein the manufacturing of the outflow element further comprises the following steps:
folding of a starting material piece such that the two-layer material piece is obtained, which comprises a corner on ends of the folding edge obtained along the folding line; and
folding in at least one portion, which is adjacent to one of the corners.

\* \* \* \* \*